United States Patent

Türkmen

[19]

[11] Patent Number: 6,121,560
[45] Date of Patent: Sep. 19, 2000

[54] SWITCHING CONTACT SYSTEM FOR A LOW VOLTAGE POWER SWITCH WITH FLEXIBLE CONDUCTORS

[75] Inventor: Sezai Türkmen, Berlin, Germany

[73] Assignee: Siemens Aktiengesellschaft, Munich, Germany

[21] Appl. No.: 09/202,156

[22] PCT Filed: Jun. 18, 1997

[86] PCT No.: PCT/DE97/01290

§ 371 Date: Dec. 9, 1998

§ 102(e) Date: Dec. 9, 1998

[87] PCT Pub. No.: WO97/50102

PCT Pub. Date: Dec. 31, 1997

[30] Foreign Application Priority Data

Jun. 21, 1996 [DE] Germany ................ 196 26 467

[51] Int. Cl.[7] .................................................. H01H 9/30
[52] U.S. Cl. .................... 200/271; 218/22; 218/30; 218/32; 335/16
[58] Field of Search .................... 29/840, 843, 860; 174/94 R; 200/265–274, 17 R; 218/1, 22, 30–36, 40, 146, 148; 219/117.1, 121.13, 121.14, 121.63, 121.64, 121.6, 136; 335/16, 106, 192, 195; 439/874, 889

[56] References Cited

U.S. PATENT DOCUMENTS

| | | | |
|---|---|---|---|
| 4,158,829 | 6/1979 | Gutberlet | 335/201 |
| 4,470,027 | 9/1984 | Link et al. | 335/16 |
| 4,583,065 | 4/1986 | Favre-Tissot | 335/106 |
| 4,922,068 | 5/1990 | Bangs | 29/860 |
| 5,032,813 | 7/1991 | Gula et al. | 335/195 |
| 5,093,988 | 3/1992 | Becker | 200/271 |
| 5,163,221 | 11/1992 | Favre-Tissot et al. | 29/680 |
| 5,184,100 | 2/1993 | Oyama et al. | 335/16 |

FOREIGN PATENT DOCUMENTS

| | | | |
|---|---|---|---|
| 0 527 472 | 2/1993 | European Pat. Off. | B23K 1/005 |
| 44 16 104 | 10/1995 | Germany | H01H 1/58 |
| 656 986 | 7/1986 | Switzerland | H01R 43/02 |
| WO 95/28724 | 10/1995 | WIPO | H01H 1/58 |

Primary Examiner—Michael Friedhofer
Attorney, Agent, or Firm—Kenyon & Kenyon

[57] ABSTRACT

A switching contact system of a low-voltage circuit breaker has a bus with cord-like flexible conductors attached thereto. The flexible conductors are accommodated between a connecting surface (30) of the bus (26) and an end piece (27), which is in contact with the connecting surface (30) of the bus (26) with at least two contact surfaces. The parts are connected by heat effect, such as soldering or electron beam welding.

8 Claims, 4 Drawing Sheets

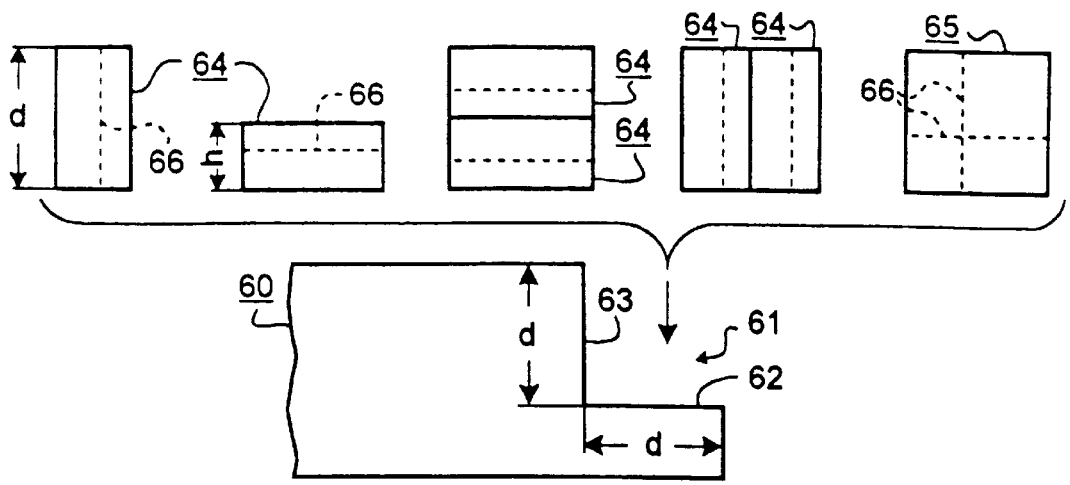
FIG 12
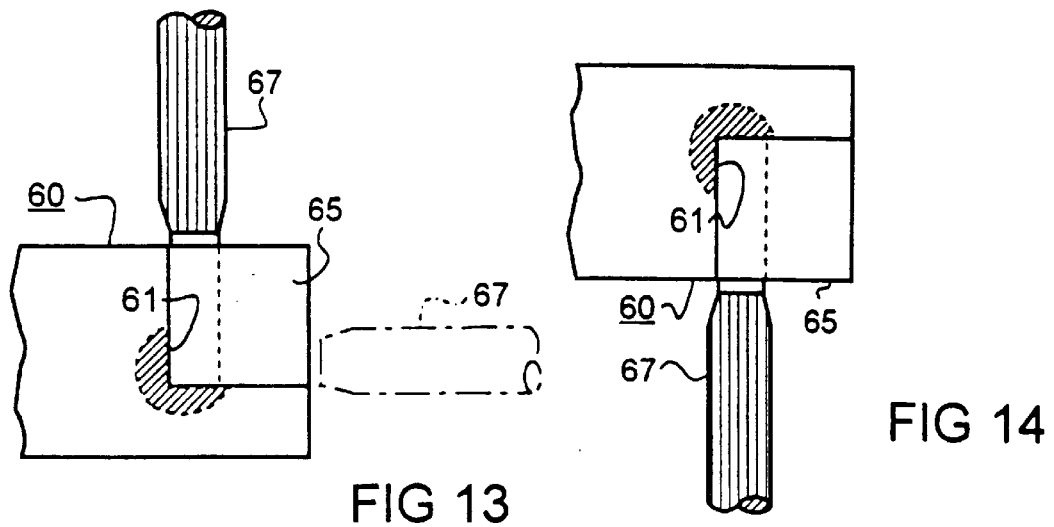
FIG 13
FIG 14
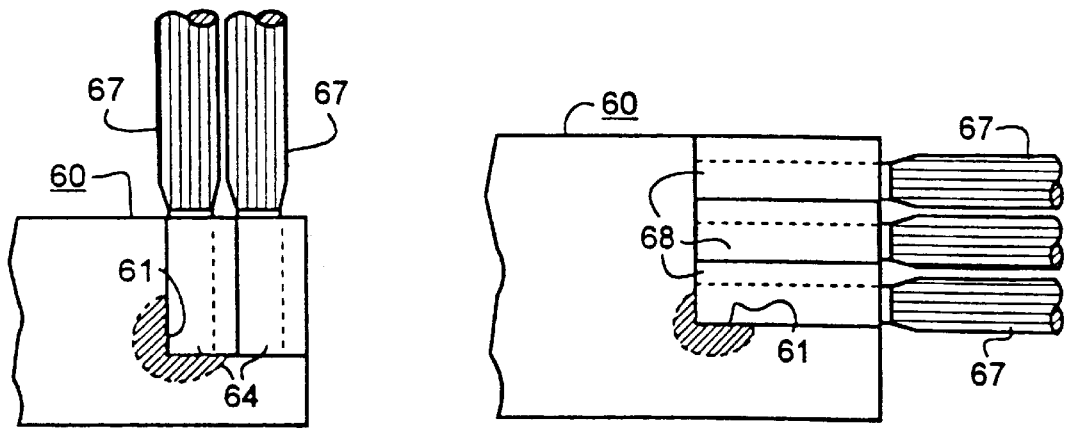
FIG 15
FIG 16

SWITCHING CONTACT SYSTEM FOR A LOW VOLTAGE POWER SWITCH WITH FLEXIBLE CONDUCTORS

FIELD OF THE INVENTION

BACKGROUND INFORMATION

The present invention relates to a switching contact system of a low-voltage circuit breaker having a bus and flexible cord conductors for connecting the bus to a movable switching contact.

BACKGROUND INFORMATION

Different versions of switching contact systems are known in the art. For example, as described in U.S. Pat. No. 4,583,065, flexible conductors are secured in recesses of a bus by a pressure welding process, i.e., without added soldering metal.

On the other hand, as described in U.S. Pat. No. 4,922,068, the ends of the flexible cord conductors are initially sealed using added soldering metal, and then these sealed ends are connected to the bus also by adding soldering metal. The sealed ends of the flexible conductor, together with a section of a foil-type soldering metal are placed on the bus, a stud or rivet serving to temporarily fasten the parts.

Furthermore, flexible conductors are known to be weldable under vacuum using an electron beam. By suitably designing the welding point, it can be achieved that the effect of heat remains confined to a small area and thus the properties of the flexible conductor are preserved (U.S. Pat. No. 5,093,988). This is essential for the service life of the switching contact arrangement.

In order to use the same semifinished part for all current intensities in a series of circuit breakers, a suitable type of flexible conductor selected can be uniformly used and adapted to the desired current intensity by using different numbers of sections of this conductor. Thus, switching contact systems for higher-intensity currents can not only have flexible conductor cords connected in series, but also a plurality of such conductor cords series connected in parallel. As described in PCT Application No. 95/28724, this large number of flexible conductors can be connected to the bus using an electron beam welding process. For this purpose, a reduced-cross-section end part of the bus is provided with a number of holes corresponding to the total number of flexible conductors needed, and suitably calibrated ends of the flexible conductors are inserted in those holes. Then the ends are welded so that the electron beam is guided over the end faces of the flexible conductors positioned approximately flush with the bus.

Regardless of which known soldering or welding process is used, the preparation for soldering or welding requires the major part of the labor expenditures at least when the number of flexible conductors is large and several parallel series of such conductors are needed. In this case, a similarly large number of recesses or holes must be provided to accommodate the flexible conductors.

SUMMARY OF THE INVENTION

Therefore, an object of the present invention is to simplify the manufacture of switching contact arrangements having a plurality of flexible conductors.

This object is achieved according to the present invention by accommodating the flexible conductors between a connecting surface of the bus and an end piece that is connected to the bus. The end piece is in contact with the connecting surface of the bus with at least one contact surface, and the bus, the end piece, and the flexible conductors are permanently connected by thermal effect.

The end piece makes it possible to omit the previously required machining of the bus for producing the recesses or holes. Instead, these features can be associated with the end piece, which, being a relatively small part, can be machined by other, more cost-effective methods than the relatively large buses. In the first place, the end piece can be designed as a standard component that can be used for buses of different dimensions and also in multiple configurations if flexible conductors are needed in the conventional multiple-series configuration (PCT Application No. WO 95/28724). In this case, several end pieces can be placed one on top of the other and then connected to each other and to the bus using the selected soldering or welding process.

One contribution within the framework of the present invention toward simplifying the manufacture of the switching contact systems can be if the end piece has a number recesses corresponding to the number of flexible conductors, at least on its end facing the end face of the bus. This measure simplifies the positioning of the flexible conductors and may make special positioning devices superfluous.

If a welding process is used for connecting the buses to the end piece and the flexible conductors, this can be performed with the following process steps:

Position the bus, the flexible conductors, and the end piece so that the end faces of the flexible conductors are flush with the adjacent surfaces of the bus and the end piece, Direct a high-energy beam onto the above-mentioned end faces and the above-mentioned adjacent surfaces with an intensity that is sufficient for melting the material of those parts.

Guide the beam along its path, which includes the end faces of all flexible conductors and the above-mentioned adjacent areas of the bus and the end piece, until the flexible conductors are permanently attached to the bus and the end piece.

An, electron beam or a laser beam can be used as a high-energy beam.

As discussed above, the switching contact arrangement according to the present invention is well suited to the use of welding or soldering processes. Below, variants using soldering processes are described.

A soldering process can be considerably simplified, in particular, by arranging at least one recess for accommodating a soldering metal piece on the connection surface of the bus and/or the side of the end piece that faces the bus. The use of such a soldering metal piece, which can also temporary position parts, is conventional. For example, the use of soldering metal pieces in manufacturing vacuum tubes is described German Patent No. 93 19 945 U1. For the purposes of the present invention, it has proven advantageous, however, that the soldering metal piece be provided with recesses for accommodating the flexible conductors in the same arrangement as the end piece.

The bus can be connected to the flexible conductors using one or more end piece according to the following steps:

The bus, the flexible conductor, and the end piece are positioned spaced apart,

At least one soldering metal piece is placed both in the groove of the bus and the groove of the end piece, The distance between the bus and the end piece is thus shortened so that an electrically well-conducting arrangement is obtained, a circuit is formed using a power supply and the above-mentioned electrically conducting arrangement, and a current of such an intensity and duration is conducted by the above-mentioned electrically conducting arrangement that the soldering metal pieces melt and the bus, the flexible conductors, and the end piece are permanently bonded together.

There are several points that should be taken into consideration to in the arrangement and basic shape of the flexible conductors. In particular, the flexible conductors can have a basic shape that is more or less different from the straight-line connection of the contact lever and the bus in order to provide a smaller or greater rotation angle of the movable switching contact without excessive stress on the flexible conductors. It may can also be convenient to arrange the flexible conductors in a loop shape in order to make use of current forces. In the context of these requirements, it may be desirable to make the direction of the flexible conductors in relation to the longitudinal direction of the bus selectable, in particular to make them conduct upward, downward or horizontally from the bus, particularly in the case where the bus is in a horizontal position, which is assumed to be normal. All these arrangements can be achieved, according to a refinement of the present invention, using standard and multifunctional parts, by arranging a step with the same height and depth at the end of the bus in order to create two perpendicular connection surfaces, and having the above-mentioned end piece feature a rectangular section with edges, at least one of which matches the height and depth of the step.

If it is initially assumed that the bus is arranged with a step pointing upward, the flexible conductors, depending on their position, can be directed so that they conduct from the bus upward or in the longitudinal direction of the bus. If the bus is mounted with a step pointing downward, the flexible conductors can be mounted so that they point downward, in addition to the horizontally conducting position.

The above-described different positions of the flexible conductors with respect to the bus can be implemented using standard parts even if the bus is to be connected to more than one series of flexible conductors. This can be achieved within the context of the present invention by the edges of the end piece section having such a length that two or more identical end pieces add up to one of the dimensions corresponding to the rectangular cross-section shape.

BRIEF DESCRIPTION OF THE DRAWINGS

FIG. 12 shows in a cutaway view a bus with a step for forming two perpendicular connecting surfaces to accommodate flexible conductors and several examples of end pieces and combinations of end pieces matching the step.

FIGS. 13 and 14 show flexible conductors conducting upwards horizontally from the bus and pointing downward with the bus in a horizontal position.

FIG. 15 illustrates a combination of two end pieces to form an overall square cross-section shape for connecting two series of flexible conductors pointing upwards to a bus.

FIG. 16 shows, as an additional example, a combination of three end pieces to form a square cross-section shape and the connection, thus made possible, of three series of flexible conductors to a bus.

DETAILED DESCRIPTION

Figure 1:
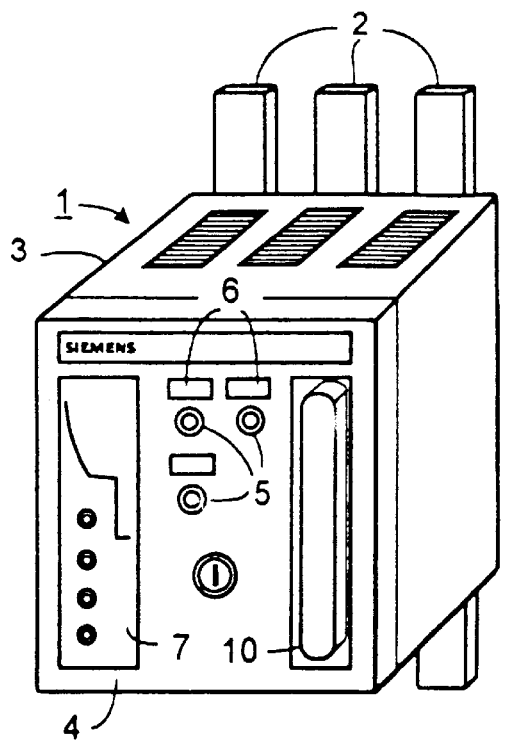
FIG. 1 schematically shows a perspective view of a three-pole low-voltage circuit breaker.

The low-voltage circuit breaker 1 shown in FIG. 1 has a three-pole design and is connected to buses having vertical bus conductors 2 arranged in the rear and therefore not visible in FIG. 1. Circuit breaker 1 has a housing 3 with a front operating panel 4. In the center of operating panel 4, there are pushbuttons 5 for turning the device on and off, and displays 6 showing the switching position and the state of an energy storage device. An electronic triggering device 7 takes up the left-hand side of operating panel 4, while a lever 10 for manually loading the above-mentioned energy storage device is mounted on the right-hand side of operating panel 4.

Figure 2:
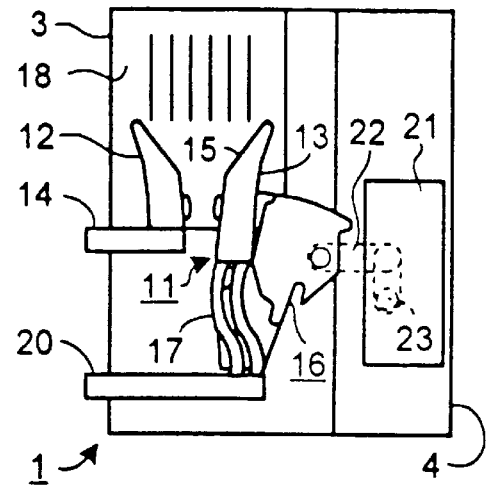
FIG. 2 shows a section through the circuit breaker of FIG. 1 in the area of a switching contact system.

According to FIG. 2, each pole of circuit breaker 1 has a switching contact system 11, which has a stationary switching contact 12 and a movable switching contact 13. Stationary switching contact 12 is connected with an upper bus 14, which projects from housing 3 on the rear side of circuit breaker 1 and can be connected to a bus conductor (e.g. bus conductor 2 of FIG. 1) leading away from circuit breaker 1. Movable switching contact 13 includes one or more contact levers 15, which are pivotably mounted on a contact support 16 and are connected to a lower bus 20, also projecting from housing 3, via flexible conductors 17. Contact support 16 is pivotably mounted in housing 3 in a manner not illustrated in detail, and can be actuated via a drive mechanism 21 and a coupling rod 22 so that contact lever(s) 15 can be or is (are) brought into contact with or separated from switching contact 12. A switching shaft 23 of drive mechanism 21 is common to all the poles of circuit breaker 1. An arc extinguishing chamber 18 is located above switching contact system 11.

The connection of the flexible conductors with the lower connecting bus can have different designs as explained in detail below. Initially an embodiment suitable for laser beam welding or electron beam welding is explained with reference to FIGS. 3, 4, and 5.

Figure 3:
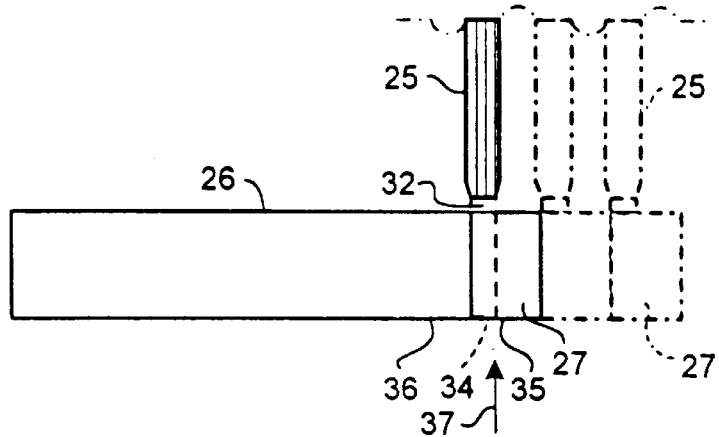
FIGS. 3 and 4 concern an embodiment that is particularly well-suited for a welding process and show a bus with an end piece joined with it and with flexible conductors in a side view and a top view. The extension of the arrangement shown using additional end pieces is shown with dot-and-dash lines.
Figure 4:
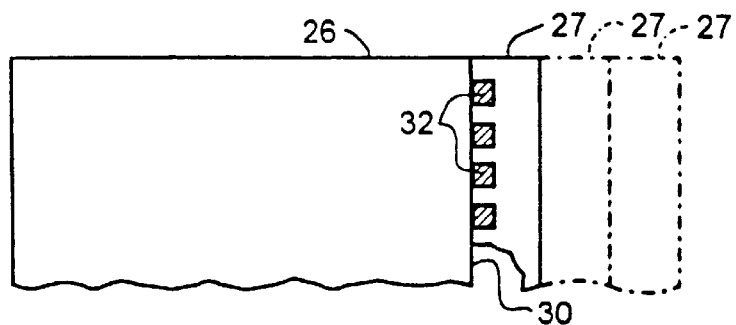

As FIGS. 3 and 4 show, flexible conductors 25 are connected to a bus 26, which can be used as lower bus 20 in FIG. 2, using an end piece 27. The width and height of end piece 27 correspond to those of bus 26. Bus 26 has a flat connecting surface 30 (FIG. 4), while end piece 27 has recesses 31 (see FIG. 5) for accommodating approximately rectangular ends 32 of flexible conductors 25. The areas remaining between recesses 30 form contact surfaces 33, via which end piece 27 is brought into contact with connecting surface 30 of bus 26.

Bus 26, end piece 27, and flexible conductors 25 are permanently bonded together using a suitable heat effect.

This is done from the position shown in FIGS. 3 and 4, where end surfaces 34 of flexible conductors 25 are flush with an adjacent surface 35 of end piece 27 and an adjacent surface 36 of bus 26. For temporary positioning of the above-mentioned parts in the desired position, a jig can be used. Since suitable jigs are essentially known, we shall refrain from a detailed explanation. The heat effect is preferably produced by a high-energy beam of the above-mentioned type (illustrated in FIG. 3 by an arrow 37) to weld the above-described pieces together.

As shown with dot-and-dash lines in FIG. 4, an additional end piece 27 can be joined with the existing end piece 27 if needed to connect an additional series of flexible conductors to bus 26. It is convenient here to join the entire desired arrangement of flexible conductors 25 and end pieces 27 in a jig and then apply heat in a continuous procedure.

Figure 5:
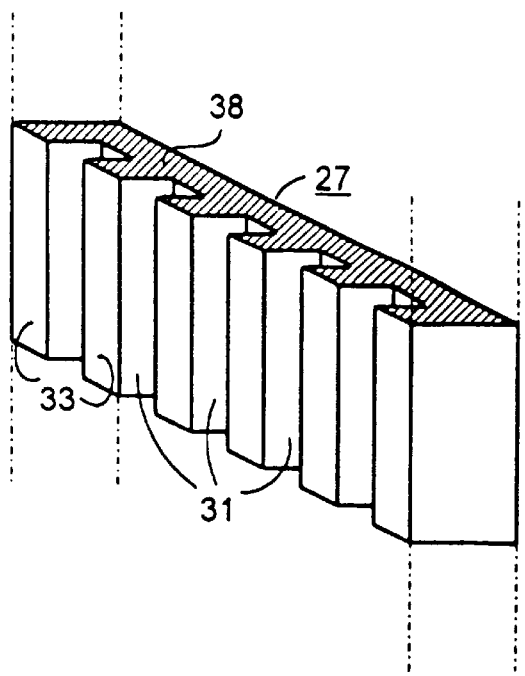
FIG. 5 shows the perspective view of an end piece for the embodiment of FIGS. 3 and 4.

End pieces 27 represent sections of a profiled semifinished piece as indicated in FIG. 5 by dot-and-dash edge lines and a shaded section surface 38. Recesses 31, used for accommodating calibrated ends 32 of the flexible conductors 25, are formed by the channels or grooves of a rolled or stamped profile without machining. Thus end pieces 27, having a dimension corresponding to the thickness of bus 26, can be separated from the semifinished part in a single separating cut (e.g., stamping, sawing or the like).

Figure 6:
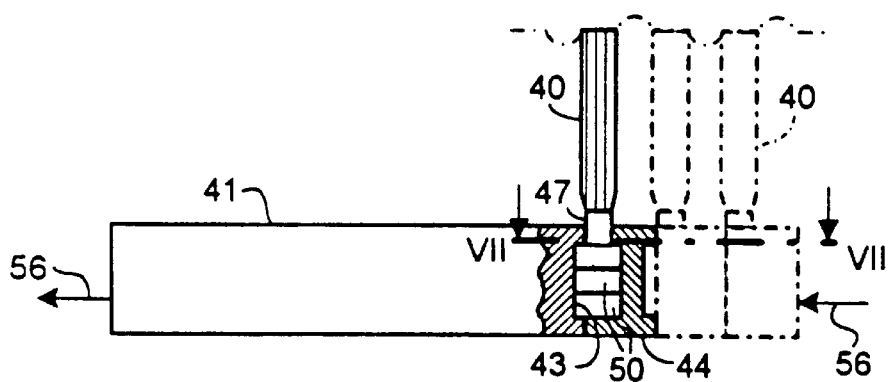
FIG. 6 shows an embodiment for a soldering process in a side view with a bus and two end pieces and soldering metal pieces joined with it.
Figure 7:
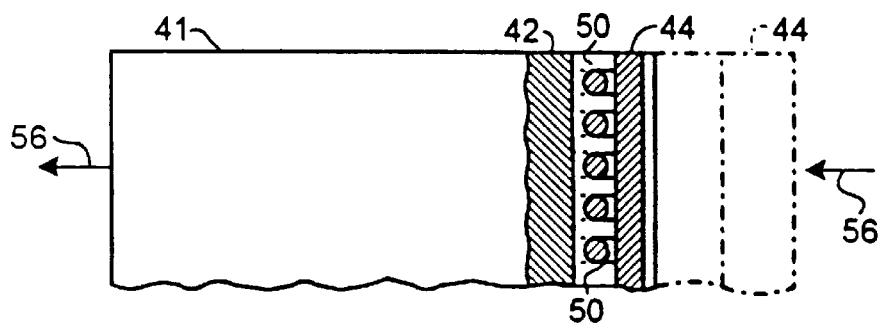
FIG. 7 shows the arrangement of FIG. 6 in a partially sectioned top view (section VII—VII in FIG. 6).

The embodiment according to FIGS. 6 and 7 is especially adapted to the use of a soldering process. As FIGS. 6 and 7 show, flexible conductors 40 are fastened to a bus 41, having a connecting surface 42 with a groove 43. A similar groove is also provided in end piece 44, shown in detail in FIG. 8. Recesses 46, shown in FIG. 8, which receive cylindrical ends 47 of flexible conductors 40, extend perpendicularly to groove 45. Recesses 46 are matched to the cross section shape of ends 47 for this purpose. The surfaces remaining between recesses 46 form contact surfaces 48 for contact with connecting surface 42 of bus 41. The metal needed for soldering is contributed by soldering metal parts 50, which are placed into recesses 43 and 45 when preparing the arrangement according to FIGS. 6 and 7. The height of recesses 43 and 45 is filled by a total of three soldering metal pieces 50 placed within one another. The number may be greater larger or smaller if soldering metal pieces 50 have different thicknesses.

Figure 9:
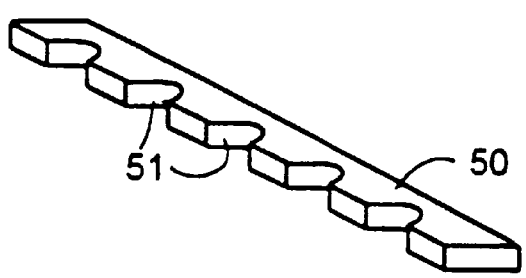
FIGS. 9, 10, and 11 show different variants of soldering metal pieces.
Figure 10:
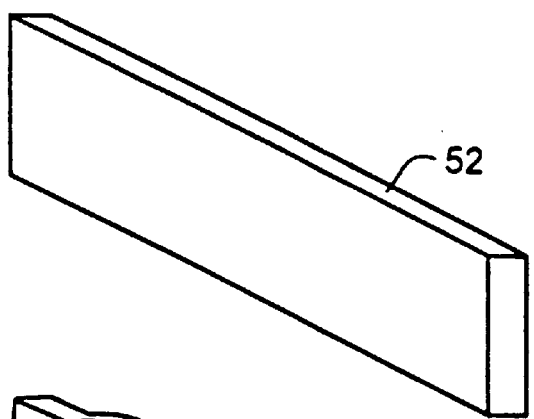
Figure 11:
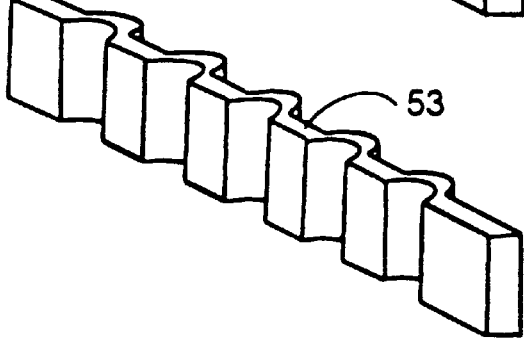

As FIG. 9 shows in more detail, soldering metal pieces 50 are designed as comb-shaped stamped parts with sections 51. However, the soldering process can also be performed with soldering metal piece 52 according to FIG. 10 or with an undulated soldering metal piece 53 matched to the arrangement of flexible conductor 40 and recess 46 in end piece 44.

To enlarge the bonding surfaces obtained in soldering between bus 41, flexible conductors 40 and end piece 44, groove 45 (FIG. 8) can be designed with a smaller depth, matching in particular recesses 46. Furthermore, the height of groove 45 with respect to the height of end piece 44 can be selected to be different from that of FIG. 8.

Figure 8:
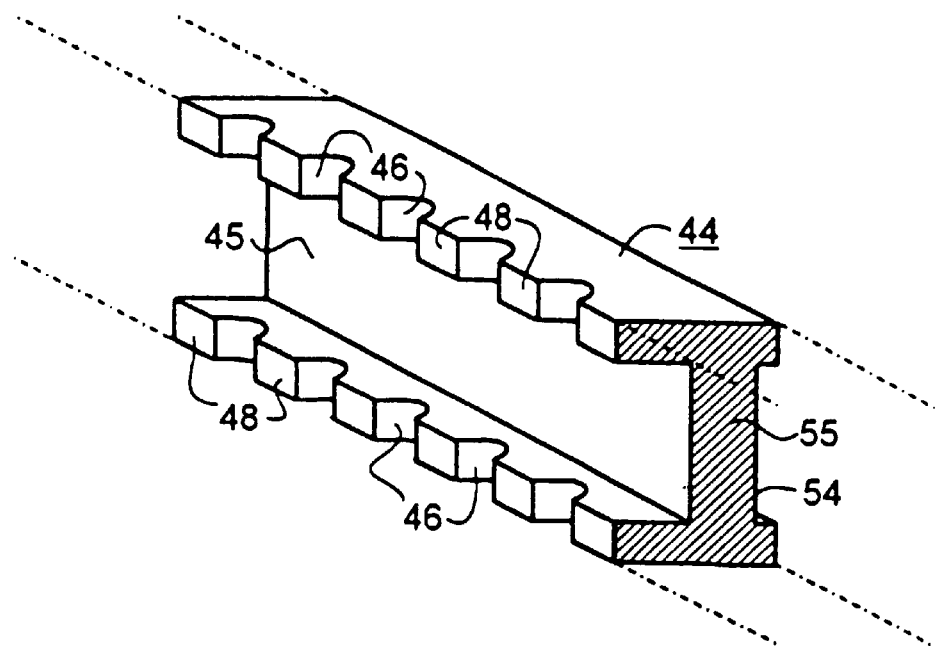
FIG. 8 shows, in an illustration corresponding to FIG. 5, an end piece for the embodiment of FIGS. 6 and 7.

As FIG. 8 further shows, end piece 44 has a groove 54, corresponding to groove 43 of bus 41, on its side opposite recesses 46. Thus additional series of flexible conductors 40 can be connected to bus 41, as shown in FIGS. 6 and 7 with dot-and-dash lines. It is also recommended to use a semifinished section, having in this case grooves 45 and 54 over its entire length, for manufacturing end pieces 44. The required parts are manufactured by cutting them off the semifinished section, as indicated in FIG. 8 by a shaded section surface 55. Recesses 46 are produced in the semifinished section or on the individual end pieces using the customary machining procedures such as stamping or cutting.

For the arrangement according to FIGS. 6 and 7, soldering heat is supplied by a current of sufficient intensity according to arrows 56. In the known manner, the required temperature depends on the selection of the soldering material. For buses, end pieces, and flexible conductors preferably made of copper, silver-containing soldering materials are well-suited, the melting point being adjusted through the silver content. When a flat soldering metal piece 52 is used, it can be reshaped to match the arrangement of flexible conductors 40 by applying, via pressure, electrodes for contact.

In the embodiments described above, it was assumed that flexible conductors extend upward perpendicularly to a bus. It may be desirable for different reasons that the flexible conductors be connected to a bus in a different direction. FIGS. 12 through 16 illustrate arrangements making this possible using standard parts. This principle is based on a bus 60, provided with a step 61 at its end. The height and depth of step 61 are the same and have a dimension d. Thus two perpendicular connection surfaces 62 and 63 are formed for connecting flexible conductors. Two different end pieces 64 and 65 are shown individually and combined with one another in different positions above step 61.

End pieces 64 and 65 shown in FIG. 12 have a rectangular section with two edges, at least one of which has dimension d of step 61. The remaining edge has a dimension h for end piece 64, which is less than dimension d, and represents an integer fraction according to the equation $d=n*h$. In this way two or more end pieces 64 can be joined so that step 61 is filled.

The other end piece 65 has a square cross-section with edge length d, so that step 61 is always filled regardless of the position of end piece 65. The position of recesses 66 to accommodate flexible conductors is shown with a dotted line. Thus a perpendicular position upward of a flexible conductor 67 according to FIG. 13 or a position indicated with dot-and-dash line, continuing in the direction of bus 60, can be achieved. If bus 60 is mounted upside down, i.e., with step 61 opening downward, the position of flexible conductor 67 shown in FIG. 14, pointing downward, is obtained.

If end pieces 64 are used, as shown in FIG. 12, that can be put together resulting in square cross-section with dimension d, two series of flexible conductors can be connected to bus 60, as shown in FIGS. 3, 4, 6, and 7. As an example, FIG. 15 shows the use of two end pieces 64, and FIG. 16 shows the use of three end pieces 68. The arrangements of FIGS. 15 and 16 allow the same variants in the position of flexible conductors 67 as illustrated in FIGS. 13 and 14 for a series flexible conductors.

What is claimed is:

1. A switching contact system of a low-voltage circuit breaker, comprising:
    a bus including a connecting surface;
    an end piece connected to the bus and being in contact with the connecting surface; and
    cord-type flexible conductors coupled to the bus, the conductors coupling the bus to a movable switching contact and being accommodated between the connecting surface of the bus and the end piece, the bus, the connecting piece, and the conductors being permanently connected to one another via a heat effect.

2. The switching contact system according to claim 1, wherein the end piece includes recesses, a number of the recesses corresponding to a number of the conductors, the recesses positioned on a side of the end piece facing the connecting surface.

3. The switching contact system according to claim 1, wherein at least one of the connecting surface and a side of the end piece facing the connecting surface has at least one groove to accommodate a soldering metal piece.

4. The switching contact system according to claim 3, wherein the end piece includes recesses, a number of the recesses corresponding to a number of the conductors, the recesses positioned on the side of the end piece facing the connecting surface, and wherein the soldering metal piece has cutouts to accommodate the conductors according to an arrangement of the recesses.

5. The switching contact system according to claim 1, further comprising:

a step having a height and depth arranged at an end of the bus to form two perpendicular connecting surfaces, the height being substantially equal to the depth, wherein the end piece has a rectangular cross-section with edges, at least one of the edges matches the height and depth of the step.

6. The switching contact system according to claim 5, wherein a length of at least one of the edges matches is such that two or more identical end pieces supplement each other to form a square cross-section shape corresponding to a dimension of the step.

7. A method of manufacturing a switching contact system, comprising the steps of:

positioning a bus, flexible conductors, and an end piece so that end faces of the flexible conductors are flush with adjacent surfaces of the bus and the end piece;

directing a high-energy beam onto the end faces with an intensity sufficient to melt material of the bus, the flexible conductors, and the end piece; and guiding the beam along a path, the path including the end faces, and the adjacent surfaces of the bus and the end piece, the beam being guided until the conductors are permanently attached to the bus and the end piece.

8. A method of manufacturing a switching contact system, comprising the steps of:

positioning a bus, flexible conductors, and an end piece so that the bus, the flexible conductors, and the end piece are spaced apart, the bus having a connecting surface;

placing at least one soldering metal piece in a recess of the connecting surface of the bus and a recess of the end piece;

shortening a distance between the bus and the end piece so that an electrically well-conducting arrangement is obtained, the flexible conductors being positioned between the contacting surface of the bus and the end piece;

forming a circuit using a power supply and the electrically well-conducting arrangement; and conducting a current by the well-conducting arrangement, the current having an intensity and a duration so that the at least one soldering metal piece melts and the bus, the conductors, and the end piece are permanently bonded together.

* * * * *